Figures 1, 2:
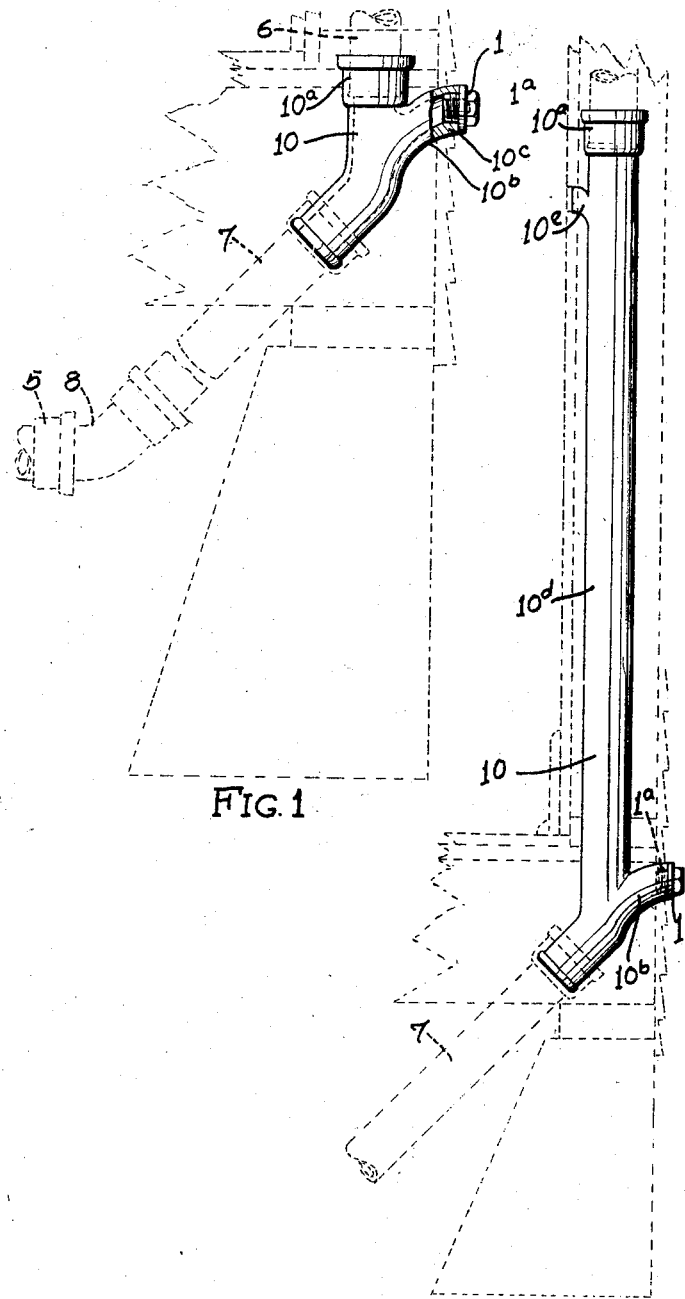

Dec. 31, 1929.       G. C. ZUCKWEILER       1,741,899
COMBINED EIGHTH BEND AND CLEANOUT PIPE FITTING
Filed April 12, 1926

INVENTOR.
GUSTAVE C. ZUCKWEILER
BY
A. B. Bowman
ATTORNEY

Patented Dec. 31, 1929

1,741,899

UNITED STATES PATENT OFFICE

GUSTAVE C. ZUCKWEILER, OF SAN DIEGO, CALIFORNIA

COMBINED EIGHTH BEND AND CLEAN-OUT PIPE FITTING

Application filed April 12, 1926. Serial No. 101,338.

My invention relates to a combined eighth bend and cleanout pipe fitting, particularly adapted for sewer or drainage pipes, also commonly known as soil pipes.

The objects of my invention are: first, to provide a fitting of this class for connecting two pipe sections positioned at an angle of 135° with each other, and which is provided at the bend with a cleanout portion extending at a right angle with one of the main run portions of the fitting; second, to provide a fitting of this class which may be positioned in the wall of a building above the conventional concrete or stone foundation thereof for connecting a vertical pipe section in the wall with a 45° pipe section connected with a drainage main, the fitting being provided with a side outlet at its bend portion, which side outlet serves as a cleanout opening and extends perpendicularly with and through an opening in the building wall above the foundation; third, to provide a fitting of this class whereby neither the concrete or stone foundation of the building wall nor the usual frame or stucco structure above the foundation need be unnecessarily cut up or destroyed when extending the cleanout portion of the fitting through the wall; fourth, to provide a fitting of this class having a small and simple screw cleanout plug which is secured in the cleanout portion extending through and vertically to the wall of the building; fifth, to provide a fitting of this class, the one run portion of which is considerably extended to take the place of several fittings now in use, and which is provided near its end with a side outlet for draining a sink or basin; sixth, to provide a fitting of this class which will take the place and perform the function of a number of fittings now used for the same purpose; seventh, to provide a novelly constructed combined eighth bend and cleanout, and one which is simple and economical of construction, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my novel fitting, showing the same connected with other pipe sections, said pipe sections and the building wall being shown by dotted lines, a portion of the fitting being broken away and in section to facilitate the illustration; Fig. 2 is a similar side elevational view of a slightly modified form of construction of my fitting.

Like characters of reference refer to similar parts and portions throughout the several views of the drawings.

Figure 1 of the drawings shows my combined eighth bend and cleanout fitting by solid lines and its relation to other pipe sections and fittings by dotted lines. This combined eighth bend and cleanout, indicated by 10 in Fig. 1, consists of an eighth bend portion provided with a hub portion $10^a$ at its one or normally upper end. The portion of the eighth bend portion provided with the hub portion is provided with a side outlet or a cleanout portion $10^b$, the axis of the opening of which extends at a right angle to the straight portion of the fitting provided with the hub portion. This side outlet or cleanout portion $10^b$ extends away from the hub portion toward the bend in the eighth bend portion and merges in gradual curves with the bend and the other straight portion or outlet of the eighth bend portion. The relation of the opening in the side outlet with the opening at the end of the eighth bend portion opposite the hub portion is such that a cleaning rod or wire may be readily inserted through the opening in the side outlet or cleanout portion and into the outlet of the eighth bend portion opposite the hub portion. The end of the eighth bend portion opposite the hub portion is secured in a manner previously described to the hub portion of a straight pipe section 7, which extends at an angle of 45° downwardly and away from the foundation wall of the building, and is secured at its lower end to the hub portion of an eighth bend 8, which is connected with the hub portion of a horizontal, or substantially horizontal, pipe section 5 leading to the sewer or other drainage system. Into the hub portion 10ª of the fitting 10 is inserted and secured the small end of a pipe section 6, which extends upwardly therefrom into and between the outer and inner sides of the building wall structure. The opening at the end of the side outlet or cleanout portion 10ᵇ is internally threaded, as indicated by 10ᶜ, and adapted to receive the externally threaded plug portion 1ª of the plug 1, which is provided with a flange intermediate its ends adapted to engage the outer end of the portion 10ᵇ. The outer end of the plug 1 is provided with suitable means for securing the plug in position.

This arrangement, made possible by means of my special fitting, permits the pipe in the wall to be connected to a horizontal drainage or sewer pipe without cutting up the foundation, the fill on the foundation and the outer side wall above the foundation, except for a small round hole in the outer side wall of the building to permit the outer end of the side outlet portion to project through the wall.

In the modified form of construction of my fitting, shown in Fig. 2, the portion between the bend and side outlet or cleanout portion and the hub portion 10ª is considerably extended, as indicated by 10ᵈ, forming a long tubular portion at the one end of the bend in the fitting, thus combining the functions and desirable features of the eighth bend and cleanout with a pipe section. Near the upper end of the tubular portion 10ᵈ is provided a small side outlet 10ᵉ on the side of the tubular portion opposite the cleanout portion. This side outlet 10ᵉ is adapted for a direct sink or basin drainage connection on the inside wall of the room, thus considerably reducing the expense in connecting such fixtures to the sewer or drainage line.

Though I have shown and described a particular construction, combination and arrangement of parts and portions and a certain modification thereof, I do not wish to be limited to this particular construction, combination and arrangement nor to the modification, but desire to include in the scope of my invention, the construction, combination and arrangement substantially as set forth in the appended claims.

Having thus described my invention, what I claim as new and desire to secure by Letters Patent is:

1. A pipe fitting, comprising a long tubular single runway portion having a hub at one end and an eighth bend portion at its opposite end, a single cleanout side outlet connected with the end of the tubular portion provided with the eighth bend portion and extending with its opening at a right angle from the tubular portion and positioned on the side thereof opposite said eighth bend portion, said side outlet merging in curved form with said eighth bend portion, and another side outlet portion extending from said tubular portion near its hub.

2. A pipe fitting, comprising a long tubular single runway portion having a hub at one end and an eighth bend portion at its opposite end, a single cleanout side outlet connected with the end of the tubular portion provided with the eighth bend portion and extending with its opening at a right angle from the tubular portion and positioned on the side thereof opposite said eighth bend portion, said side outlet merging in curved form with said eighth bend portion, and another side outlet portion extending from said tubular portion near its hub and positioned on the side thereof opposite said first mentioned outlet.

3. A fitting of the class described comprising a plain disconnected eighth bend with two straight portions and a hub and having a single runway therein and having a side outlet portion at and integral with one of the straight portions, the outlet portion of said side outlet being at a right angle with said straight portion and merging with the other straight portion in gradual curves whereby a cleanout member may be readily inserted in the last mentioned straight portion from said side outlet.

In testimony whereof, I have hereunto set my hand at San Diego, California, this 1st day of April, 1926.

GUSTAVE C. ZUCKWEILER.